US011529742B2

(12) United States Patent
Wee et al.

(10) Patent No.: US 11,529,742 B2
(45) Date of Patent: Dec. 20, 2022

(54) CONTROL OF LOW-COST ROBOTICS AND METHOD THEREFOR

(71) Applicant: Silicon Laboratories Inc., Austin, TX (US)

(72) Inventors: Ting Yit Wee, Singapore (SG); Shang-Gil Ghang, Singapore (SG); Sorin Adrian Badiu, Singapore (SG)

(73) Assignee: SILICON LABORATORIES INC., Austin, TX (US)

( * ) Notice: Subject to any disclaimer, the term of this patent is extended or adjusted under 35 U.S.C. 154(b) by 0 days.

(21) Appl. No.: 16/659,267

(22) Filed: Oct. 21, 2019

(65) Prior Publication Data

US 2021/0114224 A1 Apr. 22, 2021

(51) Int. Cl.
*B25J 9/16* (2006.01)
*B25J 9/02* (2006.01)

(52) U.S. Cl.
CPC ............... *B25J 9/1697* (2013.01); *B25J 9/02* (2013.01); *B25J 9/1664* (2013.01)

(58) Field of Classification Search
CPC ........... B25J 9/1697; B25J 9/02; B25J 9/1664
See application file for complete search history.

(56) References Cited

U.S. PATENT DOCUMENTS 3,878,983 A * 4/1975 Hamill, III ....... G05B 19/40931 700/180
6,038,520 A 3/2000 Schoonover et al.
6,184,675 B1 2/2001 Bannai
2002/0046462 A1 4/2002 Inoue et al.
2008/0013822 A1 1/2008 Pai et al.
2011/0004343 A1 1/2011 Iida
(Continued)

FOREIGN PATENT DOCUMENTS

CN 202828366 U 3/2013
JP 2006049623 A 2/2006

OTHER PUBLICATIONS

Lifei Bai, Xianqiang Yang and Huijun Gao; "Corner Point-Based Coarse-Fine Method for Surface-Mount Component Positioning"; IEEE Transactions on Industrial Informatics; vol. 14, No. 3; Mar. 2018; 10 pages.
(Continued)

*Primary Examiner* — Nicholas Kiswanto
(74) *Attorney, Agent, or Firm* — Polansky & Associates, P.L.L.C.; Paul J. Polansky

(57) ABSTRACT

A robotic arm system includes a robotic arm having at least one stepper motor and operable to move an end of the robotic arm in X-, Y-, and Z-dimensions, a camera attached to the robotic arm, and a controller coupled to the robotic arm and to the camera. During configuration, the controller moves the end of the robotic arm to a reference point to obtain initial reference coordinates and a reference image, and to a target location to obtain initial target coordinates. During operation, the controller moves the robotic arm according to the initial reference coordinates, adjusts a position of the robotic arm to an actual reference location using the camera to determine actual reference coordinates, and moves the robotic arm to an actual target location using the initial target coordinates and a difference between the initial reference coordinates and the actual reference coordinates.

20 Claims, 15 Drawing Sheets

(56) References Cited

U.S. PATENT DOCUMENTS

| | | | | |
|---|---|---|---|---|
| 2013/0238132 | A1 | 9/2013 | Kurth | |
| 2015/0120055 | A1* | 4/2015 | Miyazawa | B25J 9/1697 700/259 |
| 2016/0171331 | A1 | 6/2016 | Csefalvay | |
| 2017/0116720 | A1 | 4/2017 | Hofmann et al. | |
| 2018/0046152 | A1 | 2/2018 | Fujita et al. | |
| 2018/0161984 | A1* | 6/2018 | Ishige | B25J 19/023 |
| 2018/0161985 | A1* | 6/2018 | Kobayashi | B25J 9/1692 |
| 2018/0178388 | A1* | 6/2018 | Ishige | B25J 19/023 |
| 2018/0304467 | A1* | 10/2018 | Matsuura | B25J 9/1697 |
| 2018/0361589 | A1 | 12/2018 | Paquin et al. | |
| 2019/0322485 | A1 | 10/2019 | Kattainen et al. | |
| 2020/0238525 | A1* | 7/2020 | Drixler | B25J 9/1664 |
| 2021/0034031 | A1 | 2/2021 | Acharya et al. | |

OTHER PUBLICATIONS

Weilin Cai, Tao Xiong and Zhouping Yin; "Vision-based Kinematic Calibration of a 4-DOF Pick-and-place Robot"; IEEE International Conference on Mechatronics and Automation; Aug. 5-8, 2012; Chengdu, China; 5 pages.

Donald Labriola, P.E.; "Why open-loop steppers lose steps, and how to solve the problem"; article; machinedesign.com; section motors-drives/article/21833271; Jan. 1, 2005; 6 pages.

Wikipedia; "Backlash (engineering)"; search; Jan. 30, 2022; 3 pages.

1052-0146 Action on the Merits by U.S.P.T.O regarding U.S. Appl. No. 16/659,237, filed Oct. 21, 2019.

* cited by examiner

CONTROL OF LOW-COST ROBOTICS AND METHOD THEREFOR

CROSS REFERENCE TO RELATED APPLICATION

Related subject matter is found in co-pending application no. 16/659/237, entitled "Low-Cost Robotics and Method Therefor," filed concurrently herewith, invented by Ting Yit Wee, Shang-Gil Ghang, and Sorin Adrian Badiu, and assigned to the assignee hereof.

FIELD

The present disclosure relates generally to robotics, and more particularly to a robotic system and method for periodically manipulating objects, such as integrated circuits.

BACKGROUND

Many integrated circuit designs must be characterized after first production to ensure that the manufactured integrated circuit will operate properly and reliably across all specified operating conditions. The integrated circuits are characterized by running a series of functional and electrical tests and measuring the results using a very large-scale integration (VLSI) tester. The VLSI tester is a large and expensive computer-based system, and the characterization needs to be completed as soon as possible so the chip can be re-designed if problems are discovered, or offered for sale if the characterization is satisfactory. The characterization process of each chip may last several hours. Human operators can improve the utilization of the VLSI tester by promptly replacing a chip that has completed characterization with a new chip to be tested. However, operators are not always readily available, such as during the overnight hours, and it would be desirable if the removal of the chip and its replacement with another chip could be automated, such as by using robotics.

Modern robotics has flourished in recent years due to the availability of sophisticated electronics, motors, and machine vision. Modern robotic arm systems generally fall into two types. The first type uses sophisticated motors and electronic control systems to manipulate objects in certain high-value activities, such as automotive assembly. These robots' motors allow precision movements, and the electronics are programmed to control the robot arm to perform these precision movements. These robotic systems must be operated by experienced operators due to the safety issues caused by the programmed movements of the strong robotic arms. Moreover, these systems tend to be expensive.

The second type of robotic arm systems is the novelty robot arm. The novelty robot arm usually operates with low-cost stepper motors that allow slippage, improving safety when used by inexperienced operators because the movement will not crush the user's fingers. While the movements are less precise, the novelty robotic arm based on stepper motors is significantly less expensive. It can be operated using a human operator and a joystick, or the movements can be automatically controlled.

However, neither type of known robotic arm systems appears to be particular useful to solve the problem of automating chip replacement during characterization at comparatively low cost.

Figure 1:
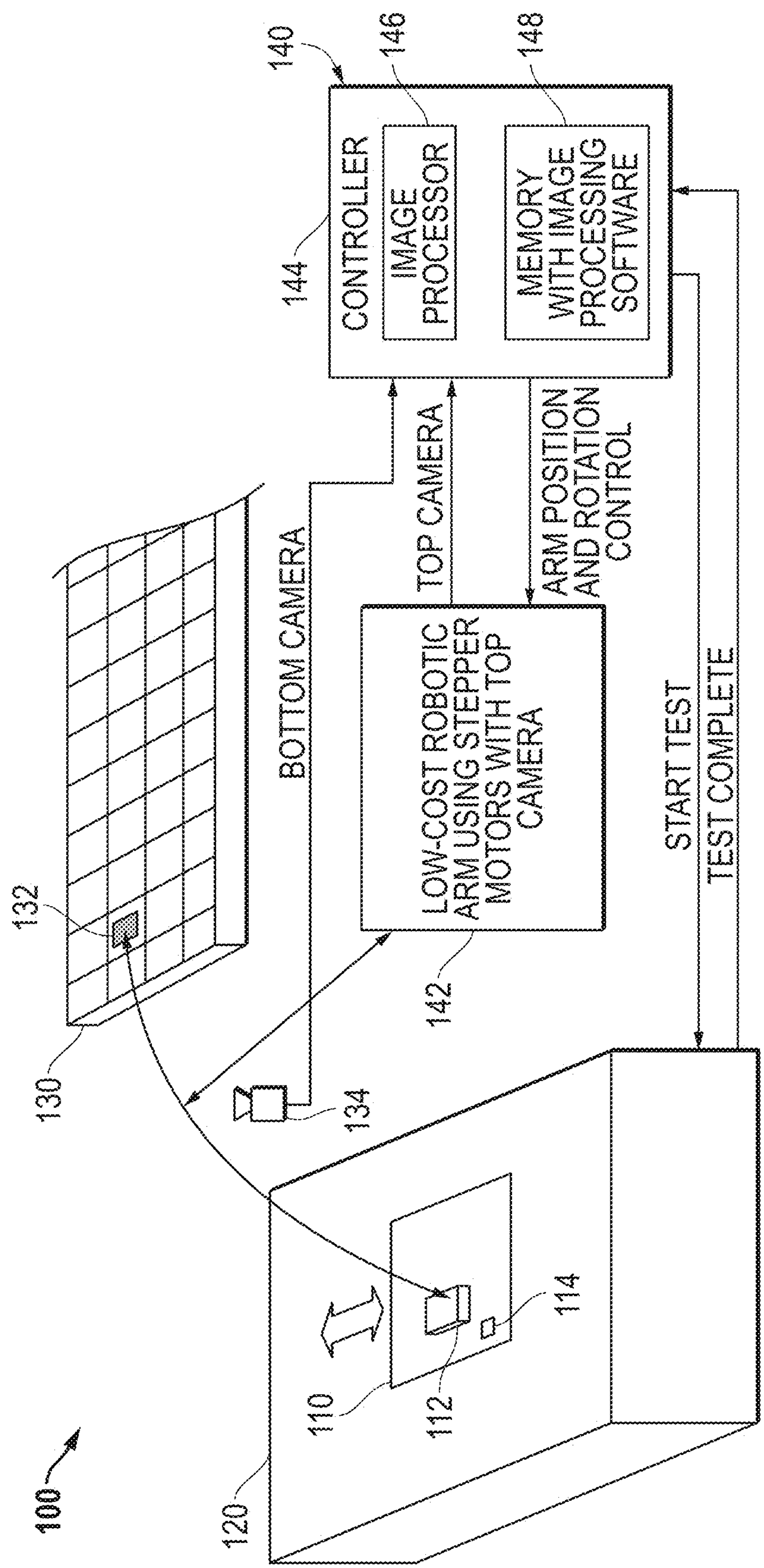
FIG. 1 illustrates in block diagram form a robotic integrated circuit placement system according to an embodiment of the present disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

FIG. 1 illustrates in block diagram form a robotic integrated circuit placement system 100 according to an embodiment of the present disclosure. Robotic integrated circuit placement system 100 includes generally a test board 110, a tester 120, a chip tray 130, and a robotic arm system 140.

Test board 110 includes a socket 112 and a fiducial marker 114. Socket 112 is attached to a top surface of test board 110 and includes electrical contacts to various connectors for conducting power, ground, and various electrical signals. Socket 112 holds the integrated circuit and has metallic contacts to allow the integrated circuit to conduct various input, output, power, and ground signals. For example, socket 112 may be electrically connected to an integrated circuit packaged using a ball grid array (BGA) package or a flat, no-lead (FN) package. Test board 110 is a multi-layer printed circuit board that uses fiducial marker 114 as a distinct pattern to help identify its orientation to equipment using machine vision (to be described further below).

Tester 120 is a VLSI tester that is electrically connected to test board 110. Tester 120 is capable of executing various electrical and functional tests useful in characterizing an integrated circuit that has been placed in socket 112. Typically, tester 120 is a micro-computer that includes a memory that stores functional test patterns, and executes a test program. Tester 120 has an input for receiving a signal labeled “START TEST” and an output for providing a signal labeled “TEST COMPLETE”.

Chip tray 130 contains an array of slots for storing integrated circuits, including an integrated circuit 132. As will be described below, chip tray 130 has properties that are useful in locating integrated circuit 132 among its various slots. Also FIG. 1 shows chip tray 130 as having four rows and eight columns, but the size is arbitrary and will vary between different embodiments. Adjacent to chip tray 130 is a bottom camera 134 that is useful in seeing the underside of chips that are moved between chip tray 130 and socket 112. Bottom camera 134 has an output for a signal labeled “BOTTOM CAMERA”.

Robotic arm system 140 includes a robotic arm 142 and a controller 144. Robotic arm 142 is a low-cost robotic arm using stepper motors and having a camera that robotic arm system 140 uses to move integrated circuit 132 from chip tray 130 to socket 112, and then to return integrated circuit 132 from socket 112 back to chip tray 130 when the characterization of integrated circuit 132 is complete. Robotic arm 142 has an input for receiving an arm position and rotation control signal, and an output for providing a signal labeled “TOP CAMERA”. Controller 144 has an input for receiving the BOTTOM CAMERA signal, an input for receiving the TOP CAMERA signal, an input for receiving the TEST COMPLETE signal, an output for providing the arm position and rotation control signal, and an output for providing the START TEST signal. Controller 144 includes an image processor 146 that is bidirectionally connected to a memory 148 that stores image processing and other control software.

In operation, controller 144 controls robotic arm 142 to pick up integrated circuit 132 from chip tray 130 and place it in socket 112 and then activate the START TEST signal. Tester 120 is responsive to the START TEST signal to initiate a characterization that includes one or a suite of functional and electrical tests on integrated circuit 132. Note that before tester 120 begins the characterization and after a chip has been placed in socket 112, a linear slider system (not shown in FIG. 1) moves tester 120 or a portion of it so that socket 112 is placed under a temperature forcing device (not shown in FIG. 1). The temperature forcing device allows characterization to occur at extremes of a specified temperature range, for example from −40 degrees Celsius or +125 degrees Celsius. After the completion of the characterization, tester 120 activates the TEST COMPLETE signal, and controller 144 controls robotic arm 142 to remove integrated circuit 132 from socket 112 and move it back to chip tray 130. Robotic arm 142 is a low-cost robotic arm that includes stepper motors. Stepper motors are low cost, but are prone to slippage. Because the slippage prevents exact location measurements, robotic integrated circuit placement system 100 uses bottom camera 134 and a top camera integrated with robotic arm 142 along with image processing to intelligently move and control robotic arm 142. In addition because robotic arm 142 uses stepper motors that allow slippage and reduces safety concerns compared to precision robotic arms, it can be placed “uncaged” in an open environment and is suitable for a small pick-and-place system such as a chip characterization system.

As will be explained more fully below, controller 144 operates using several image processing pipelines that process the raw images received from either bottom camera 134 or the top camera to determine the location of the end of the arm. In the illustrated embodiment, controller 144 implements the image processing pipelines using an image processor 146 and image processing software stored in memory 148. As used herein, an image processor can be a specialized data processor, for example a graphics processor or a single instruction multiple data (SIMD) processor that is especially efficient at various image processing operations. Alternatively, it can be a general-purpose processor such as the central processing unit of a personal computer that is programmed to perform the image processing operations.

Exemplary image processing operations include masking, color substitution, gaussian blurring, pixel thresholding, image inversion, color space transformation, and image contouring. After these operations are performed, controller 144 performs geometric operations to obtain position location. In one embodiment, image processor 146 performs one or more image processing operations defined by the “OpenCV” instruction set. OpenCV (Open Source Computer Vision Library) is an open source computer vision and machine learning software library first developed by the Intel Corporation and released in 2000. OpenCV was built to provide a common infrastructure for computer vision applications and to accelerate the use of machine perception in commercial products. In other embodiments, image processing software can be implemented using non-OpenCV functions.

Figure 2:
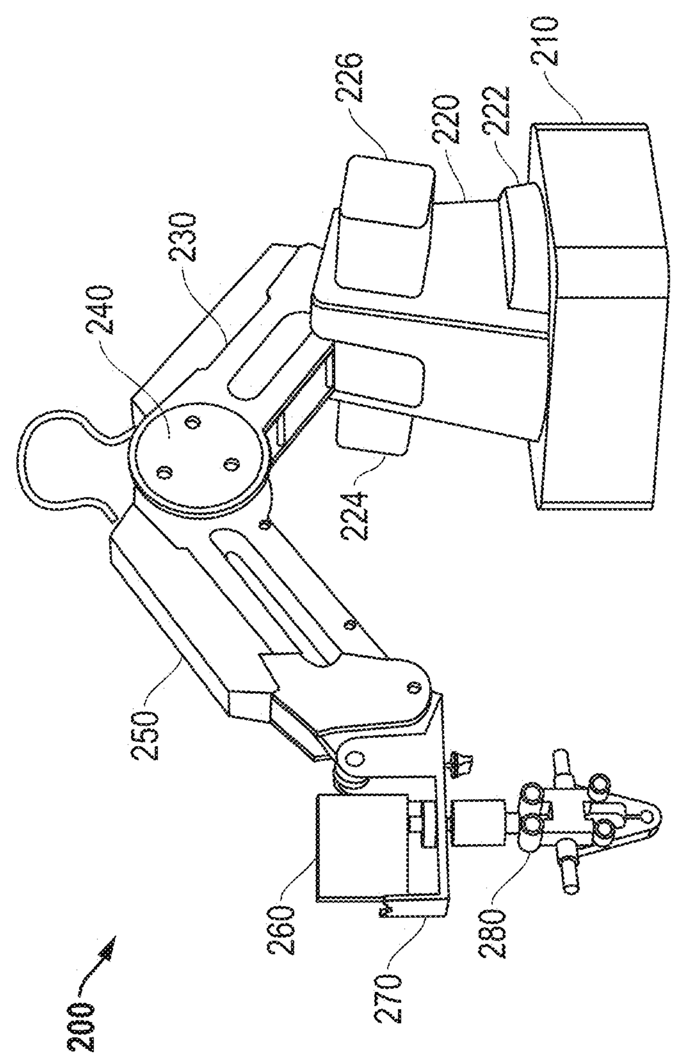
FIG. 2 illustrates a perspective diagram of a robotic arm known in the prior art.

FIG. 2 illustrates a perspective diagram of a robotic arm 200 known in the prior art. In the example shown in FIG. 2, robotic arm 200 is a robotic arm developed and sold under the trademark “Dobot Magician” by Shenzhen Yuejiang Technology Co., Ltd. of Shenzhen, China. Robotic arm 200 includes generally a base 210, a bottom portion 220, an upper arm 230, a joint 240, a forearm 250, a rotational motor 260, a tool holder 270, and a clamp 280. Base 210 is a relatively heavy base that allows bottom portion 220 to rotate with respect to base 210. Bottom portion 220 includes a stepper motors 222, 224, and 226 to control the position of the robotic arm in the X-, Y-, and Z-directions. Rotational motor 260 allows rotation of the tool held by tool holder 270, e.g. clamp 280, in the rotational or “R-direction”. Robotic arm 200 uses stepper motors 222, 224, and 226 that are prone to slippage, but is relatively inexpensive.

Figure 3:
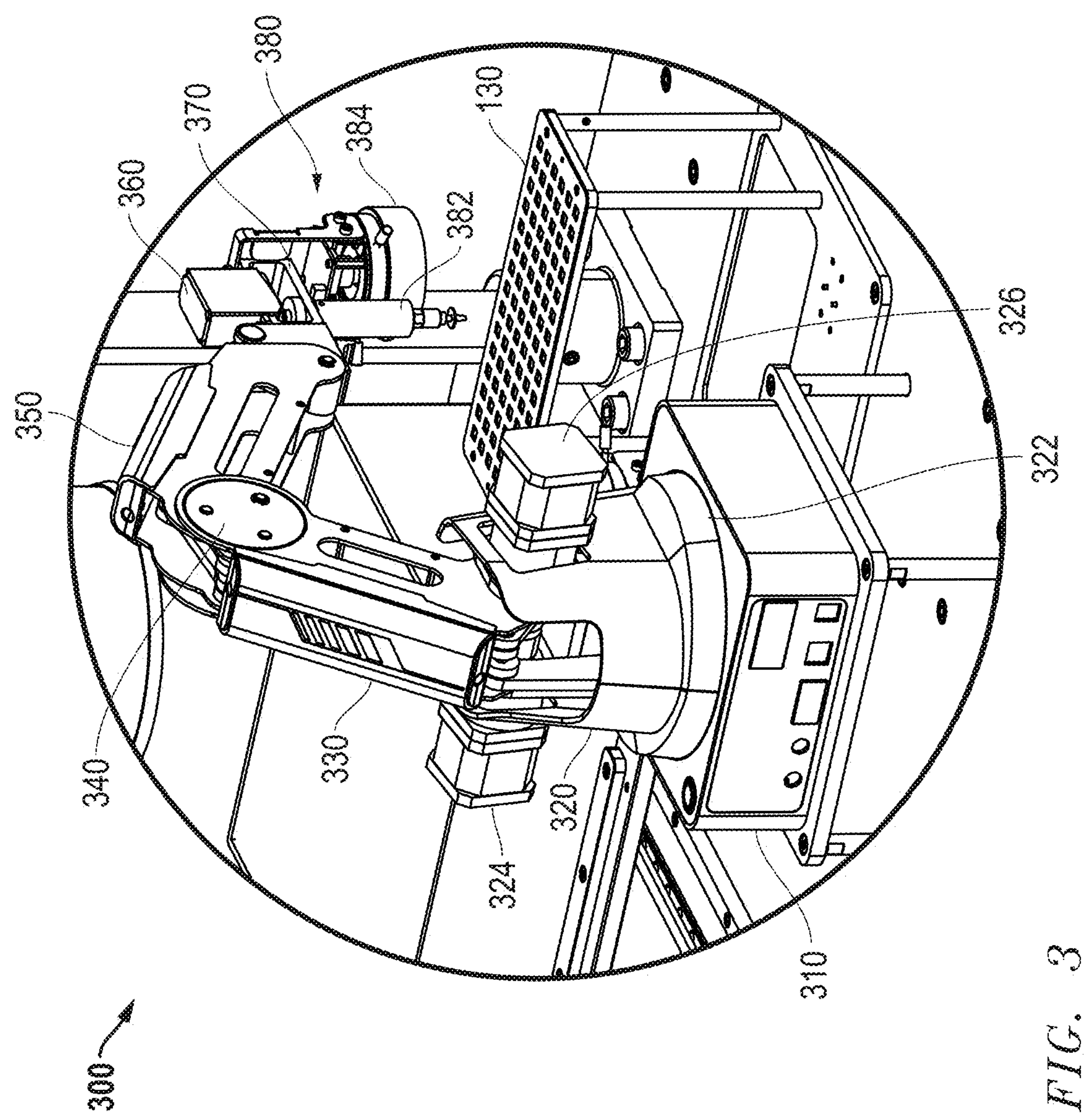
FIG. 3 illustrates a perspective diagram of a robotic arm that can be used with the chip tray of FIG. 1 to implement a portion of the robotic integrated circuit placement system of FIG. 1.

FIG. 3 illustrates a perspective diagram of a robotic arm 300 that can be used with chip tray 130 to implement a portion of the robotic integrated circuit placement system 100 of FIG. 1. Robotic arm 300 includes generally a base 310, a bottom portion 320, a rear arm 330, a joint 340, a forearm 350, a rotational motor 360, a tool holder 370, and a tool 380. Base 310 is a relatively heavy base that allows bottom portion 220 to rotate with respect to base 210. Bottom portion 320 includes a stepper motors 322, 324, and 326 to control the position of the end of robotic arm 300 in the X-, Y-, and Z-directions. Rotational motor 360 is a servo motor that allows rotation of the tool held by tool holder 370 in the R-direction. Robotic arm 300 includes a tool 380 that allows it to be used for integrated circuit placement. Tool 380 includes a suction tip 382, and a top camera assembly 384. Suction tip 382 is a pneumatic suction device that is attached to tool holder 370 and allows robotic arm 300 to pick up and deposit an integrated circuit chip. As can be seen in FIG. 3, suction tip 382 includes a circular area just above the end of the suction tip. The circular area is a green backing attached to the suction tip such that the chip can be imaged against a consistent background, as will be described further below. Top camera assembly 384 includes a top camera of the integrated circuit placement system, not visible in FIG. 3, as well as a light source for illuminating the object being inspected.

Figure 4:
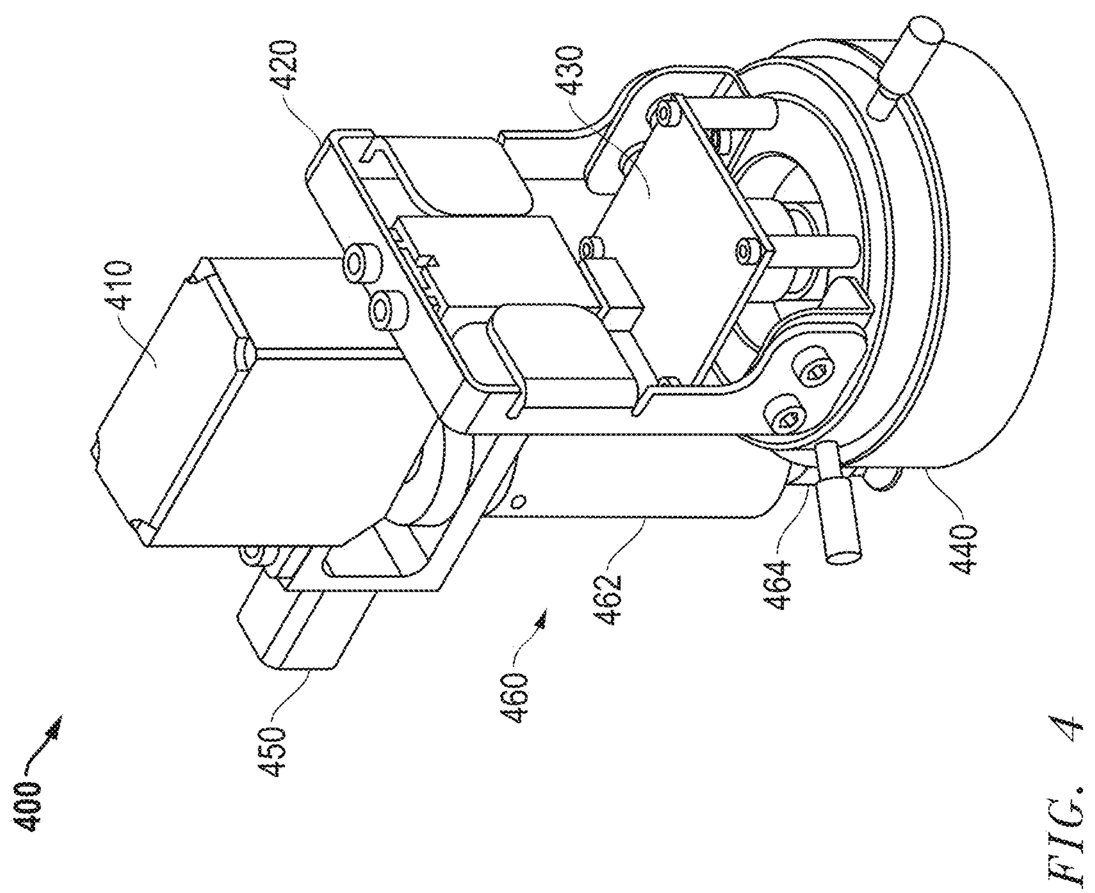
FIG. 4 illustrates a perspective diagram of a tool assembly that can be used as the tool assembly of the robotic arm of FIG. 3.

FIG. 4 illustrates a perspective diagram of a tool assembly 400 that can be used as the tool assembly of the robotic arm 300 of FIG. 3. Tool assembly 400 includes a rotational motor 410, a tool holder 420, a top camera 430, a light emitting diode (LED) fixture 440, a servo assembly 450, and a suction tip assembly 460. Servo assembly 450 is attached to tool holder 420 and controls the rotational position or "R-position" of suction tip assembly 460 but does not affect top camera 430 or LED fixture 440. LED fixture 440 projects a sufficient amount of light onto the target area, and top camera 430 includes a camera attached thereto (including mounting hardware, optics, and an image sensor) to capture images that image processor 146 uses to measure the position of suction tip 464. Suction tip assembly 460 includes an adapter 462 and a suction tip 464. Servo assembly 450 controls rotational motor 410 to control suction tip 464. Tool assembly 400 is an assembly that is adapted for use with robotic arm 200 of FIG. 2 and includes an LED fixture 440, a camera that forms the top camera, and a suction tip 464 that can be used to pick up and deposit integrated circuit chips.

Figure 5:
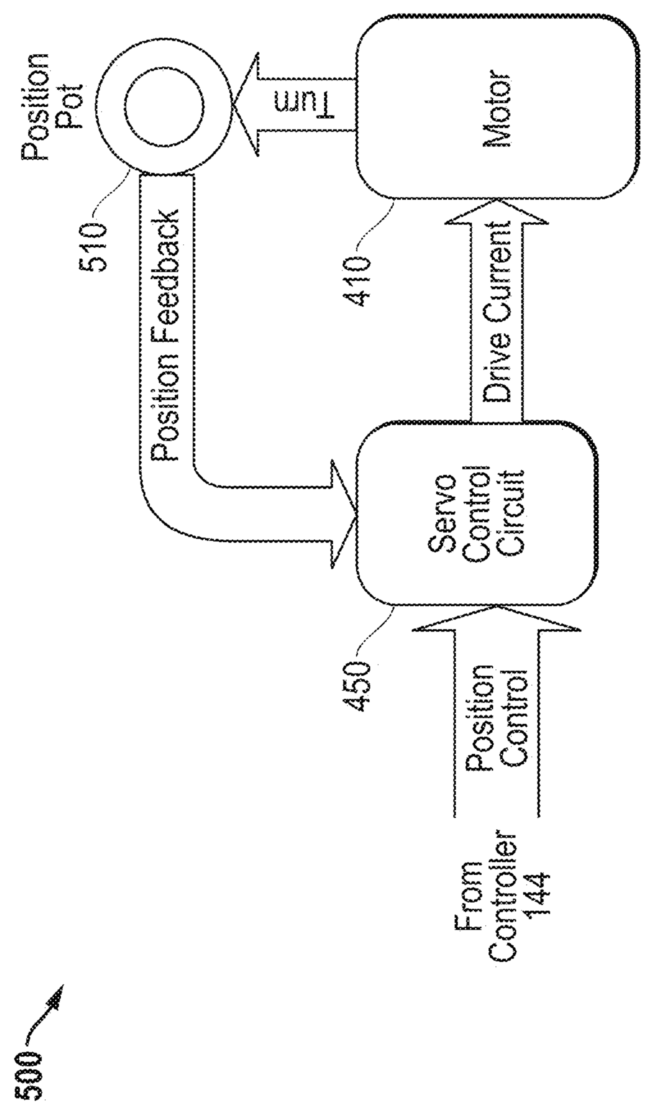
FIG. 5 illustrates in block diagram form a servo control system that can be used in the servo assembly of FIG. 4.

FIG. 5 illustrates in block diagram form a servo control system 500 that can be used in servo assembly 450 of FIG. 4. Servo control system 500 includes generally rotational motor 410, a servo control circuit in the form of servo assembly 450 of FIG. 4, and a position potentiometer 510. Controller 144 provides a position command, e.g. rotate +90°, and servo control circuit 450 provides a drive current to rotational motor 410 to turn it by that amount (or to move it to that rotation position). Position potentiometer 510 changes its resistance based on the rotational position of rotational motor 410. The resistance of position potentiometer 510 is then used by servo assembly 450 to form an error signal as a difference between a desired position indicated by the POSITION COMMAND and the rotation indicated by position potentiometer 510. By including a small amount of circuitry to implement servo control system 500, robotic integrated circuit placement system 100 provides good rotational control to avoid the need for continuous visual feedback and adjustment of the rotation of the target chip in the R dimension.

Figure 6:
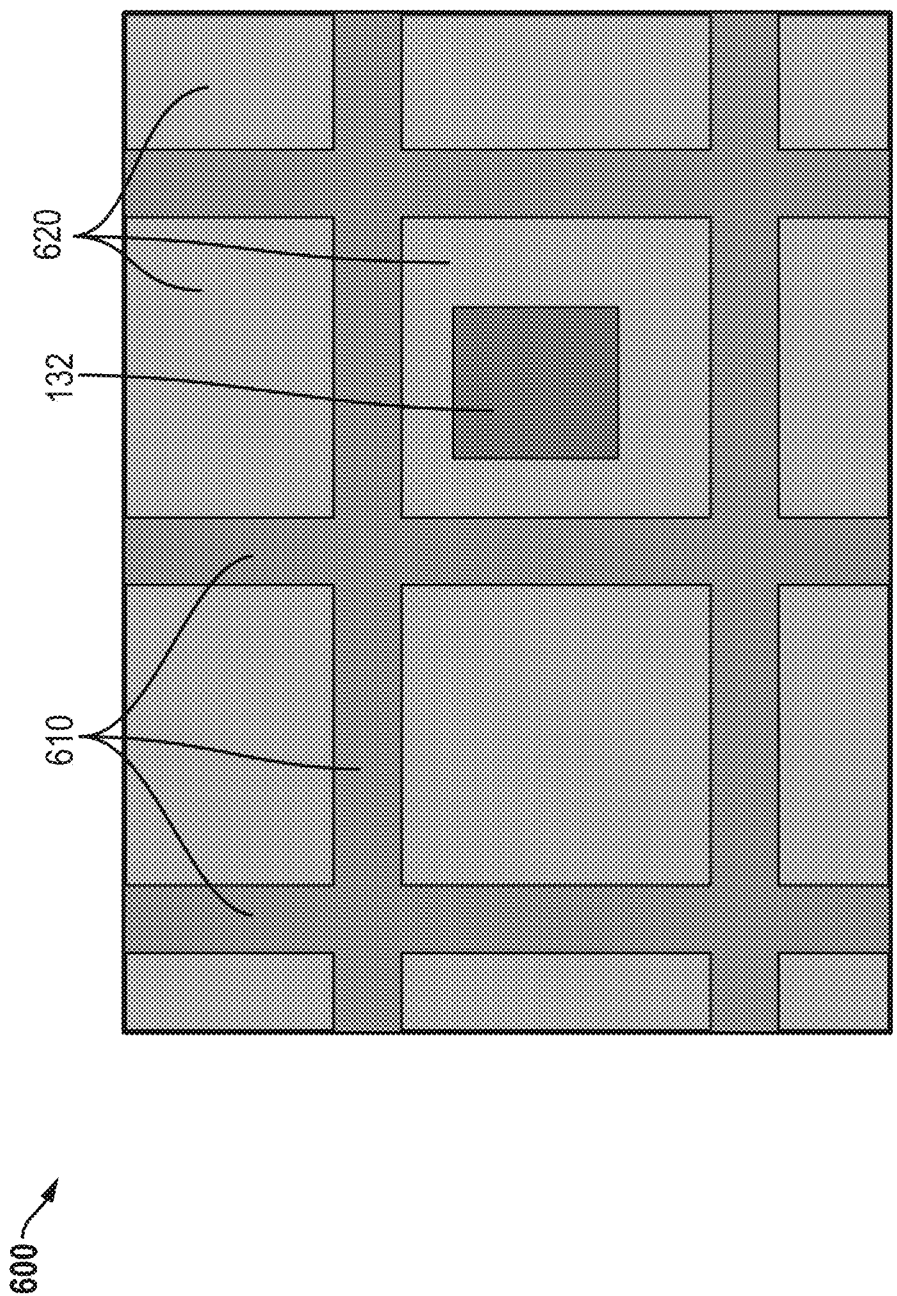
FIG. 6 illustrates a portion 600 of chip tray 130 of FIG. 3.

FIG. 6 illustrates a portion 600 of chip tray 130 of FIG. 3. Portion 600 includes a frame 610 and exemplary slots 620. Frame 610 includes a grid of elevated portions that defines slots 620 and prevents the chips from moving between sockets. Frame 610 has a different color than slots 620, so that image processor 146 can distinguish them and find a target chip, such as integrated circuit 132. In the example shown in FIG. 6, frame 610 is green, but in other embodiments, it can be another suitable color that can be distinguished from the slots. Notice that integrated circuit 132 is somewhat smaller than its corresponding slot 620, allowing it to move laterally within the socket, and with potentially random orientation.

Figure 7:
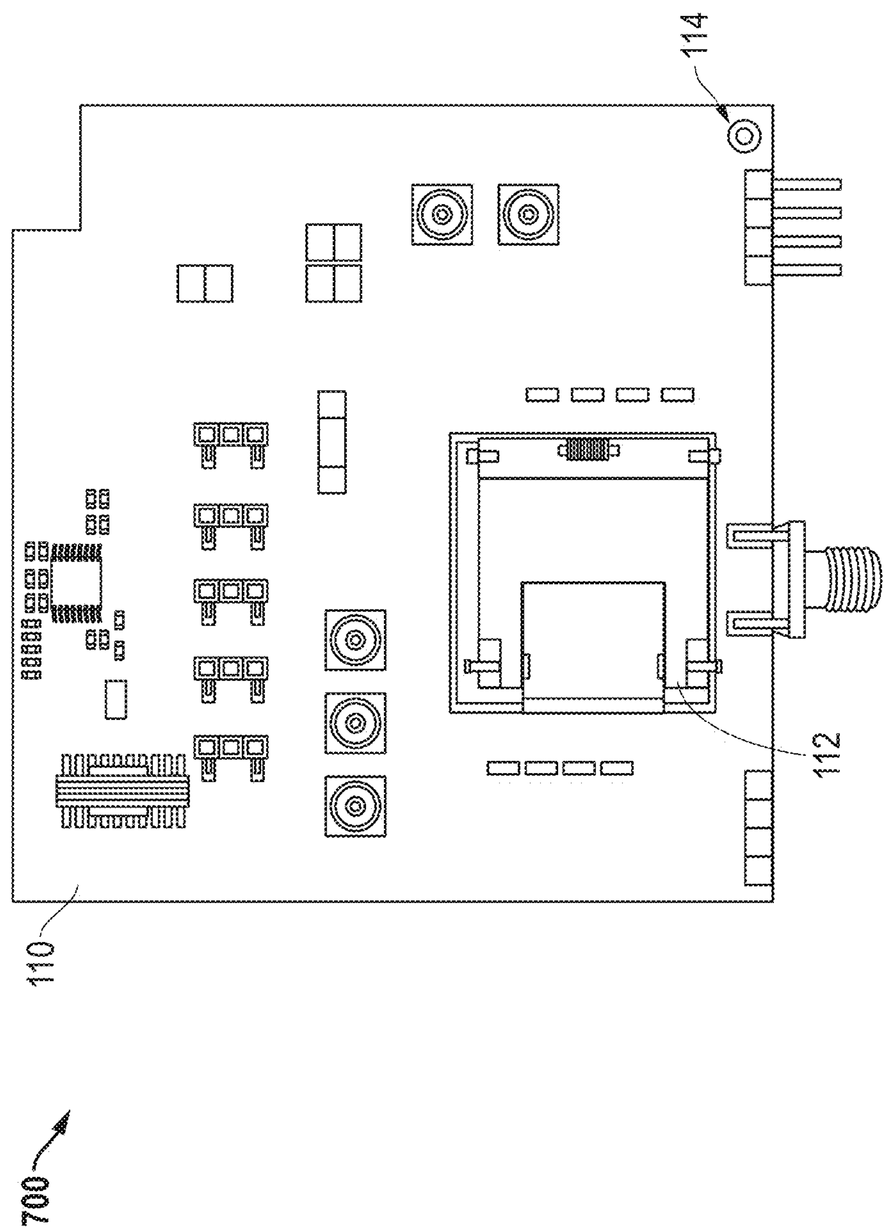
FIG. 7 illustrates a top view of an integrated circuit test board that can be used in the robotic integrated circuit placement system of FIG. 1.

FIG. 7 illustrates a top view 700 of a test board that can be used as test board 110 of FIG. 1. As shown in FIG. 7, socket 112 is adapted for the type, size, and pin placement of integrated circuit 132. Moreover, fiducial marker 114 is in the bottom right corner as test board 110 is oriented in FIG. 7 and is circular to allow pattern recognition using image processing but also to distinguish it from mostly straight traces on test board 110. Because of the relatively short distance between fiducial marker 114 at the edge of test board 110 and socket 112, controller 144 can locate fiducial marker 114 and then move the chip to socket 112 with little opportunity for slippage.

Printed circuit boards (PCBs) such as test board 110 are typically coated with a thin polymeric film to protect the underlying components. This film can reflect light and, along with various reflective metal components mounted on the PCB, can interfere with the identification of fiducial marker 114. However according to one embodiment described further below, image processor 146 performs a reflection compensated color detection operation to accurately identify fiducial marker 114 in the presence of reflections.

Exemplary Image Processing Pipelines

In the illustrated embodiment, controller 144 uses several image processing pipelines to perform the overall operation of moving integrated circuit 132 to and from socket 112 and executing tests on it. These image processing pipelines are illustrative of how various types of image processing on images taken with cameras associated with robotic integrated circuit placement system 100 can be used to extend the capabilities of a low-cost robotic arm to perform useful functions. All of these image processing pipelines will be described generally with specific image processing operations they perform, while certain image processing pipelines of special interest will be described in detail. It should be understood that while these image processing pipelines may be used in an actual embodiment, other image processing pipelines are possible, and the image processing operations listed herein are merely illustrative.

Acquire Chip Profile

An exemplary image processing platform known as the "acquire chip profile" pipeline uses images taken by bottom camera 134 to determine the rotation and position offset from the camera of the chip picked from chip tray 130. Since integrated circuit 132 may be rotated and offset from the center of the suction tip, controller 144 can use this measurement to rotate the tool and subtract the offset so that robotic arm 142 places the integrated circuit properly into socket 112.

Figure 8:
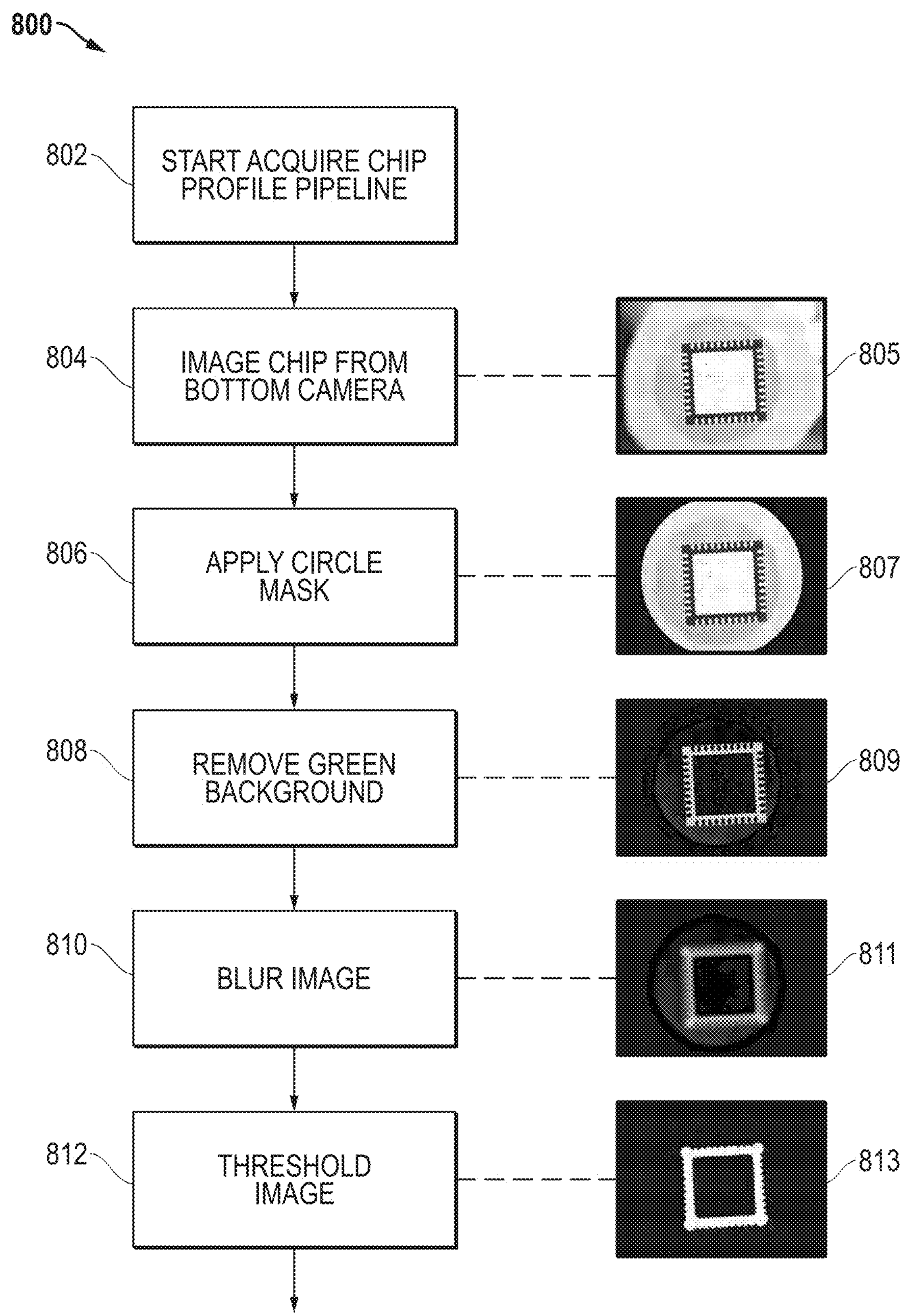
FIGS. 8-10 illustrate a flow diagram of an exemplary acquire chip profile pipeline with corresponding images.
Figure 9:
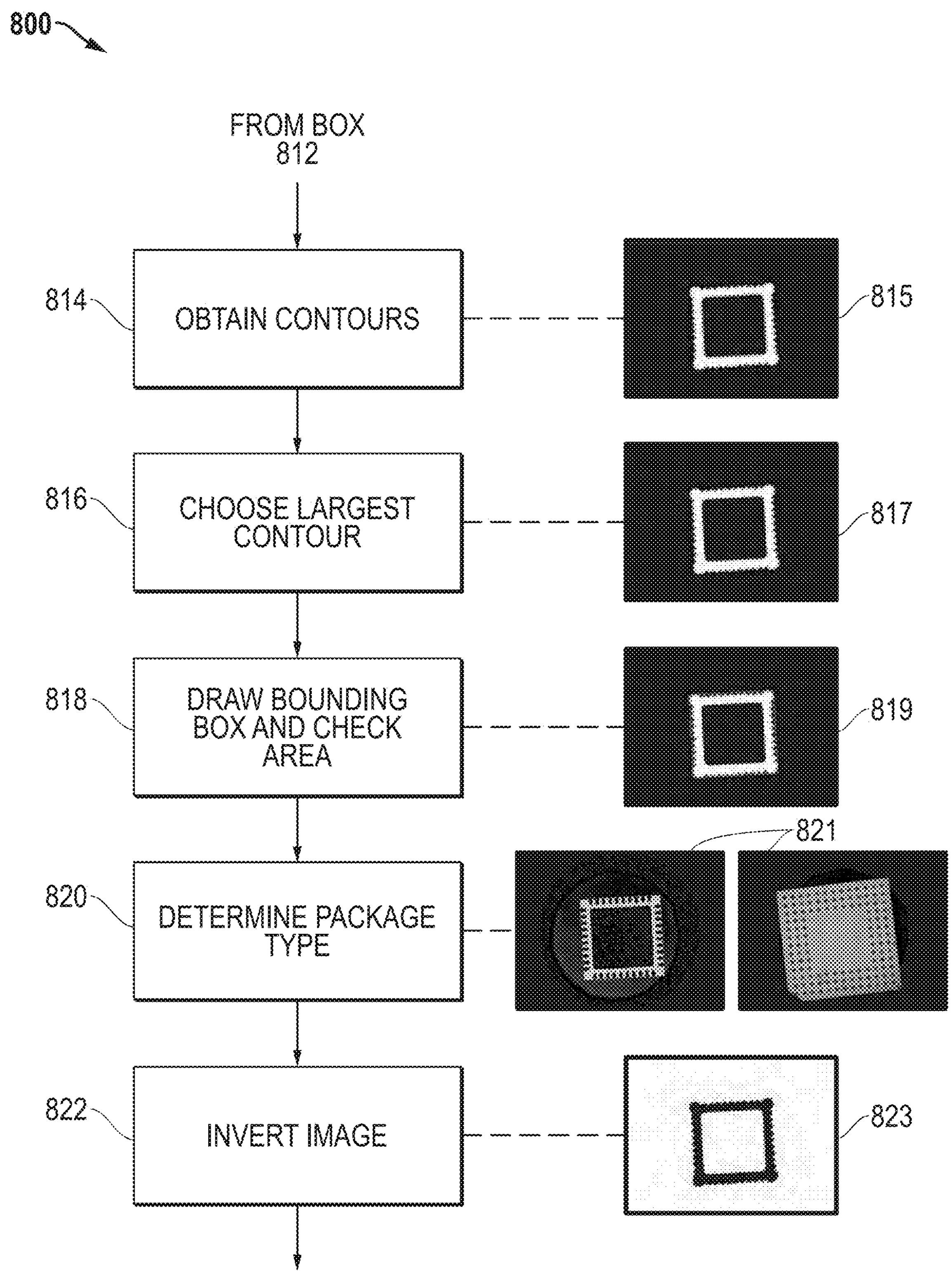
Figure 10:
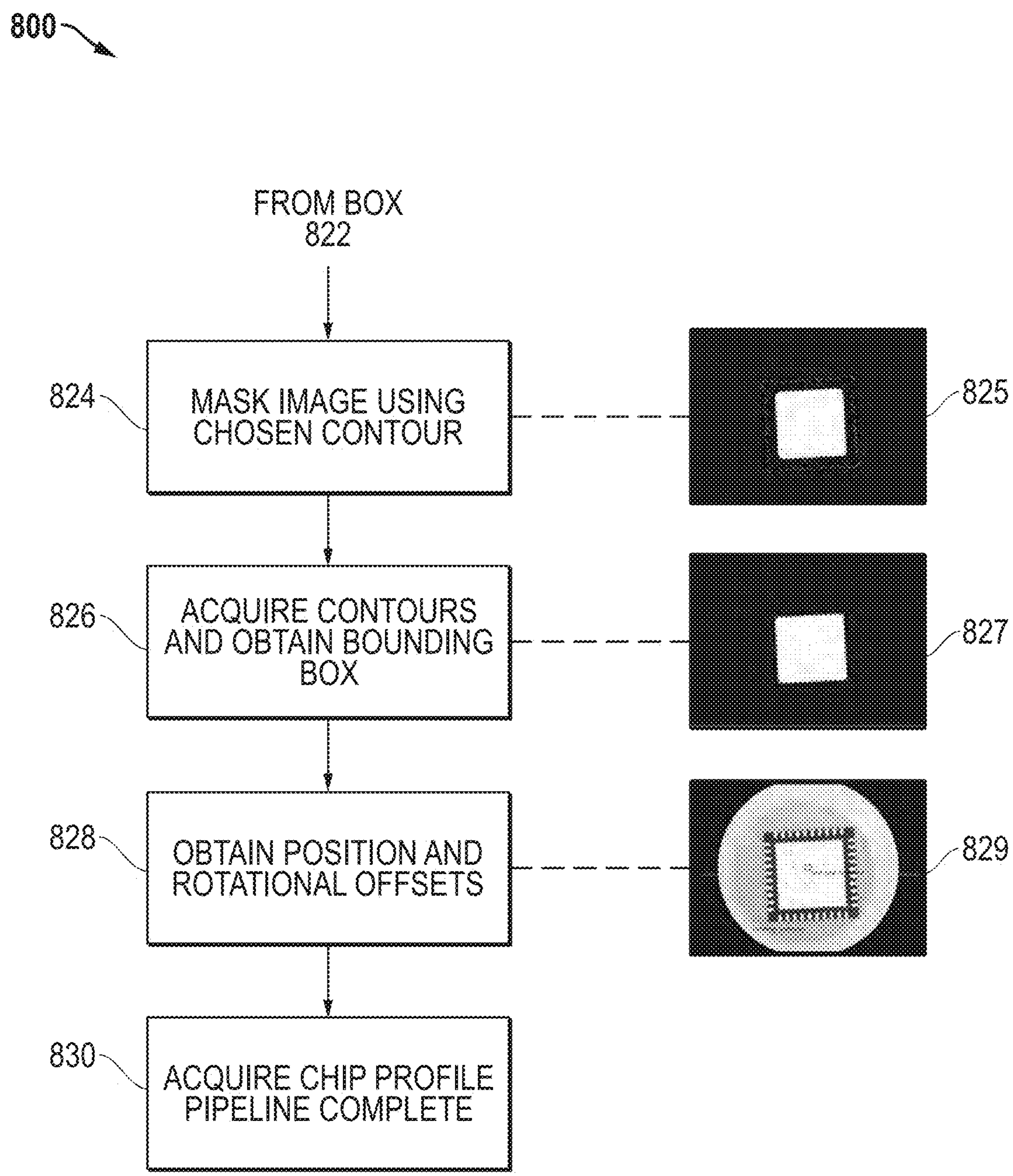

FIGS. 8-10 illustrate a flow diagram of an exemplary acquire chip profile pipeline 800 with corresponding images. In a box 802, image processor 146 starts acquire chip profile pipeline 800. In box 804, controller 144 moves integrated circuit 132 into the field of vision of bottom camera 134 and provides the image to controller 144. The field of view of bottom camera 134 needs to be wide enough to account for a reasonable amount of stepper motor slippage. An exemplary image is shown in image 805. In this example, integrated circuit 132 is a 40-pin, plastic quad flat-pack no-lead (QFN) type package as seen from the underside. The terminals are around the perimeter and a metallic ground pad is contained in the center.

At box 806, image processor 146 applies a circle mask. Applying the circle mask reduces background noise within a certain radius near the center of the image by setting the red-green-blue (RGB) values to [0, 0, 0]. Image 807 shows the image in the circle with the remaining area blackened.

At box 808, image processor 146 removes the green-colored background created by the green backing just above the end of the suction tip. Image processor 146 reads only the green (G) channel of the colored image, and inverts the single-channel image to set the non-green pixels to a high value. The result is shown in image 809.

At box 810, image processor 146 blurs the image to reduce noise and dust particles. Image processor 146 performs the OpenCV gaussian blur operation to blur the image, as shown in image 811.

At box 812, image processor 146 thresholds the blurred image to decide which pixels to accept as part of the chip. Image processor 146 converts the image to a binary image in which each pixel becomes either a "1" or a "0". It does so by determining whether the pixel value is greater than a threshold. If so, then the value is converted to "1"; otherwise, it is converted to "0", as shown in image 813.

In FIG. 9 at box 814, image processor 146 obtains the contours of the binary image to group the pixels together and draw their perimeters. Image processor 146 obtains the contours of groups of pixels whose neighboring pixels share the same value, for both bright and dark pixels, as shown in image 815.

At box 816, image processor 146 chooses the largest contour to reduce the probability of random color groups being selected, for example patches and background. Image processor 146 checks the number of pixels enclosed by each contour, and chooses the contour with the most pixels (also known as the area), as shown in image 817.

At box 818, image processor 146 checks whether the chip has really been picked up. Image processor 146 draws the best-fitting bounding box that encloses the chosen contour with the least area. It calculates the area of the bounding box, as shown in image 819, and if the area is less than a minimum amount, indicating that it corresponds to the suction tip profile rather than a chip, it generates an error code.

At box 820, image processor 146 determines the package type. In the exemplary embodiment, the package type can be either QFN or BGA, as shown in images 821, in which a bottom view or a QFN package is shown on the left, and a bottom view of a BGA package is shown on the right. BGA chips are generally larger than corresponding QFN chips, and the suction tip profile behind a BGA chip is unlikely to be seen. Image processor 146 uses the bounding box obtained in box 818 to immediately obtain positional and rotational offsets without further image processing for BGA chips. QFN chips are generally smaller than corresponding BGA chips, and the suction tip profile behind a QFN chip may interfere with the chip parameter acquisition, and image processor 146 preferably uses the center ground pad to obtain the positional and rotational offsets and performs further image processing.

At box 822, image processor 146 acquires the large, bright ground pad. It does so by inverting the image obtained at box 812. Image processor 146 changes all pixels with a value of 1 to 0, and all pixels with a value of 0 to 1, as shown in image 823.

In FIG. 10 at box 824, image processor 146 ensures that it acquires the bright pixels within the chip boundary only. It applies a mask to isolate the portion of the image within the contour obtained at box 816, and causes the masked areas of the image have pixel values of 0, as shown in image 825.

At box 826, image processor 146 obtains the chip profile using the center ground pad. It repeats boxes 816 and 818, and the image obtained thereby is shown in image 827.

At box 828, image processor 146 obtains the X- and Y-coordinates from the chip center to the camera center as well as the rotational offset of the chip, for both BGA and QFN package types. Image processor 146 first finds the centroid of the chip using, e.g., the OpenCV moments function. It then calculates the X- and Y-distances from the center of the bottom camera. It also uses the X- and Y-coordinates of the lower two corners of the bounding box to calculate the rotation of the chip. In the example shown in FIG. 8, image processor 146 determines that the offset is +3, i.e. the chip is rotated 3 degrees counterclockwise (as viewed from the bottom) on the rotational (or R) axis.

At box 830, acquire chip profile pipeline 800 is complete.

Thus to perform acquire chip profile pipeline 800, image processor 146 performs the following image processing functions: applying a circle mask, performing a single-channel (e.g. color) inversion, applying an OpenCV gaussian blur, performing binary conversion, performing contour recognition, grouping and processing pixels, calculating the area of the resulting geometric shape, thresholding, performing image inversion, performing masking, locating the center of a geometrical shape using the OpenCV moments function, and calculating offsets and rotation in the geometrical shape.

Acquire Tray Slot

Another exemplary image processing pipeline known as the "acquire tray slot" pipeline. The acquire tray slot pipeline determines whether controller 144 has positioned the robotic arm tool above the tray slot containing the target chip. The acquire tray slot pipeline uses top camera 430 to determine the positional offsets between the target tray slot and the camera center. Controller 144 can then use the offset to adjust the position of the robotic arm, so that the suction tip is over the target chip slot in chip tray 130 so that the suction tip can extract and deposit integrated circuit 132 from and to the target tray slot, respectively.

Figure 11:
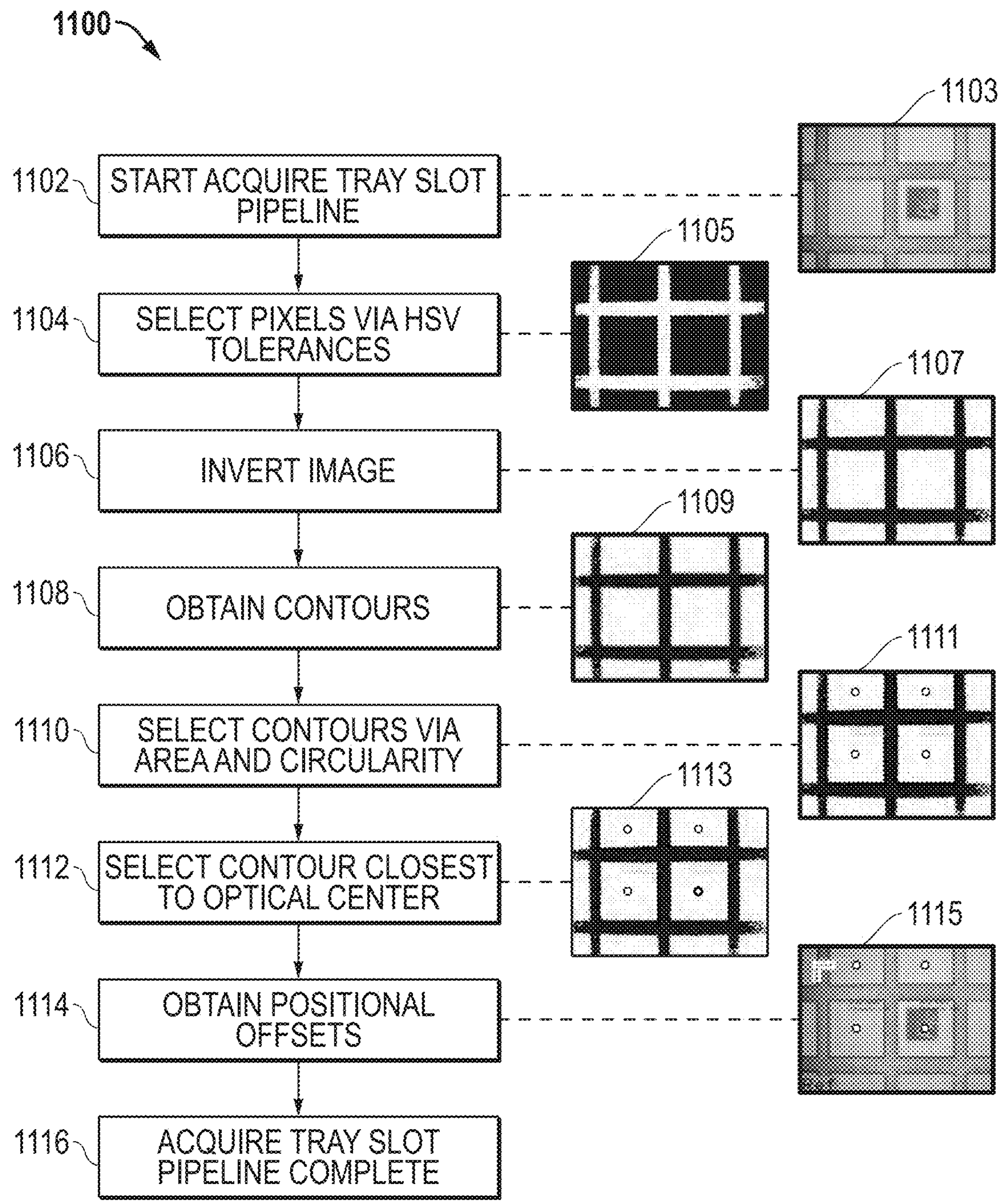
FIG. 11 illustrates a flow diagram of an exemplary acquire tray slot pipeline with corresponding images.

FIG. 11 illustrates a flow diagram of an exemplary acquire tray slot pipeline 1100 with corresponding images. The goal of the acquire tray slot pipeline 1100 is to locate a target tray slot from which to extract or return an integrated circuit. Acquire tray slot pipeline 1100 uses the top camera, and returns positional offsets from the camera center to the desired chip (e.g. integrated circuit 132) in chip tray 130. In a box 1102, image processor 146 starts acquire tray slot pipeline 1100. Acquire tray slot pipeline 1100 assumes that controller 144 can move the robotic arm tool to within a reasonable distance from the target chip slot. Image 1103 shows a top view of a portion of chip tray 130 holding a chip of interest, as previously shown above. To facilitate the image processing, the chip tray frame should be differently colored from the slot and the chip to assist image processor 146 in acquiring the location of the desired chip in the chip tray.

At box 1104, image processor 146 identifies the tray frame by its hue color. Note that in one embodiment, the top camera is a widely-available USB camera that provides a conventional RGB output. Image processor 146 first performs color space conversion to change the RGB values into corresponding HSV (hue, saturation, value) values to allow pixels to be selected directly by their hue. The RGB color space combines brightness information with color information and the RGB color space can be described as a three-dimensional value color space along R, G, and B axes. In the HSV color space, however, the V component can be ignored. The H and S components can be described as a polar coordinate system in which the hue H corresponds to the angle, and the saturation S to the magnitude. Image processor 146 converts the image into a binary image by transforming the HSV image into a binary image based on certain criteria. If the H value is close to a hue reference value corresponding to the color of the tray frame (in this example, green) and S is between upper and lower saturation thresholds, acquire tray slot pipeline 1100 sets the value of the pixel to "1" (pure white), and sets it to "0" otherwise (pure black). Thus, image 1105 is a black-and-white image in which the white areas are set to "1" and correspond to the green frame, and the black areas are set to "0" and correspond to the slots.

At box 1106, image processor 146 acquires the chip slots by excluding the chip frame. Image processor 146 inverts the binary image to change the "1" (white) pixels into "0" (black) pixels, and vice versa, as shown in image 1107

At box 1108, image processor 146 obtains the contours of the binary the image by grouping the pixels together and drawing their perimeters. Image processor 146 obtains the contours for groups of pixels whose neighboring pixels share the same value, for both bright and dark pixels, as shown in image 1109.

At box 1110, image processor 146 selects contours via area and circularity. It filters out noise blobs that would otherwise be mistaken as contours representing a chip slot. Thus, it checks the area to filter pixel groups that are too small or too large. Then it checks for circularity to filter excessively asymmetrical pixel groups. First, image processor 146 determines the area of each enclosed contour as the number of pixels contained within it. Blobs are first selected if their area falls between a minimum and a maximum amount, identifying them as possible slots. Then the blobs are checked for their circularity. The circularity check proceeds as follows. First, image processor 146 determines their centers using the OpenCV moments function. Circularity is defined as the ratio of the minimum distance from the center, divided by the maximum distance from the center. If this ratio is greater than 0.5, then the blob is judged to be a slot and not a noise blob. For example, as shown in image 1111, a right slot has a circularity of 0.68, whereas a left slot has a circularity of 0.69, indicating that both of these blobs are slots and not noise blobs.

At box 1112, image processor 146 selects the contour closest to the optical center. The purpose of this operation is to identify the contour that is most likely to represent the target chip tray slot. Because all the slots are similar, chip tray 130 does not have a mechanism to distinguish slot identity. Thus, the robotic arm moves to the best guess of the target tray slot. For example, the target tray slot may be the slot immediately adjacent to the prior slot to the right of the previously selected slot. In this case, image processor 146 would control robotic arm 142 to move it to the previous position but increment it by an amount equal to the pitch of one chip tray slot. Thus box 1112 is able to compensate for a reasonable amount of stepper motor slippage. Image processor 146 measures distances from the centroids of the chosen contours to the top camera, and then picks the slot with the closest centroid. For example, image processor 146 selects the centroid on the right slot in image 1113, whose centroid marker is shown as bolder than the centroid of the left contour and each of the two top contours in FIG. 11.

At box 1114, image processor 146 obtains positional offsets from the camera center. The offsets are the X- and Y-distances from the top camera, whose center is the small dot, to the center of the target tray slot. As shown here, the position of the chip in the slot will be slightly off-centered, but can be easily corrected by re-positioning robotic arm 142.

At box 1116, acquire tray slot pipeline 1100 is complete.

To perform acquire tray slot pipeline 1100, image processor 146 performs the following image processing functions: performing color space conversion from RGB to HSV, pixel inversion, performing contour recognition, calculating area and circularity on geometric shapes, determining centroids of geometric shapes, and calculating offsets from the centroid.

Acquire Suction Tip Profile

Yet another exemplary image processing platform known as the "acquire suction tip profile" pipeline. Acquiring accurate chip position and rotational offsets between the chip in the socket are important because neither top camera 430 nor bottom camera 134 can see the suction nozzle after the chip has been picked up. Hence the position of the suction tip must be centered at the optical center of bottom camera 134. Misalignment may occur due to prior slippages, and can only be checked before the chip is picked up. If the suction tip is properly centered, and if the chip is picked up at its center, then the chip's center will then be exactly at the optical center of bottom camera 134. The acquire suction tip profile pipeline acquires the suction tip's X-, Y-, and Z-positions relative to bottom camera 134. The acquire suction tip profile pipeline captures the suction tip position before picking up the target chip, because it cannot be seen after the chip has been picked up. The acquire suction tip profile pipeline returns positional offsets from the camera center and the area of suction tip profile. Controller 144 calculates the area of the suction tip profile to obtain suction tip's Z-position, in which a larger area indicates that the suction tip is relatively closer to camera, and a smaller area that the suction tip is farther away from camera. To return accurate results, the acquire suction tip profile pipeline requires good focus on bottom camera 134.

In an exemplary embodiment, to perform the acquire suction tip profile pipeline, image processor 146 performs the following image processing functions: applying a circle mask, performing color-based thresholding, applying an OpenCV gaussian blur, performing binary conversion, pixel grouping and processing, calculating area and circularity on geometric shapes, locating the center of a geometrical area using the OpenCV moments function, and calculating offsets in the geometrical area.

Acquire Fiducial Marker

Still another exemplary image processing platform known as the "acquire fiducial marker" pipeline. The acquire fiducial marker pipeline is used to acquire the X-, Y- and Z-position of top camera 430 relative to the X, Y, and Z position of fiducial marker 114 on test board 110. Note that fiducial marker 114 is especially designed to contrast the size and shape of common PCB surface features. The acquire fiducial marker pipeline uses top camera 430, and returns positional offsets from the center of top camera 430 as well as the detected area of fiducial marker 114. Image processor 146 used the detected area to obtain the Z-position of top camera 430, in which a larger measured area indicates that top camera 430 is closer to fiducial marker 114, and a smaller measured area indicates that top camera 430 is farther away from fiducial marker 114. To return accurate results, the acquire fiducial marker pipeline requires good focus on top camera 430.

Figure 12:
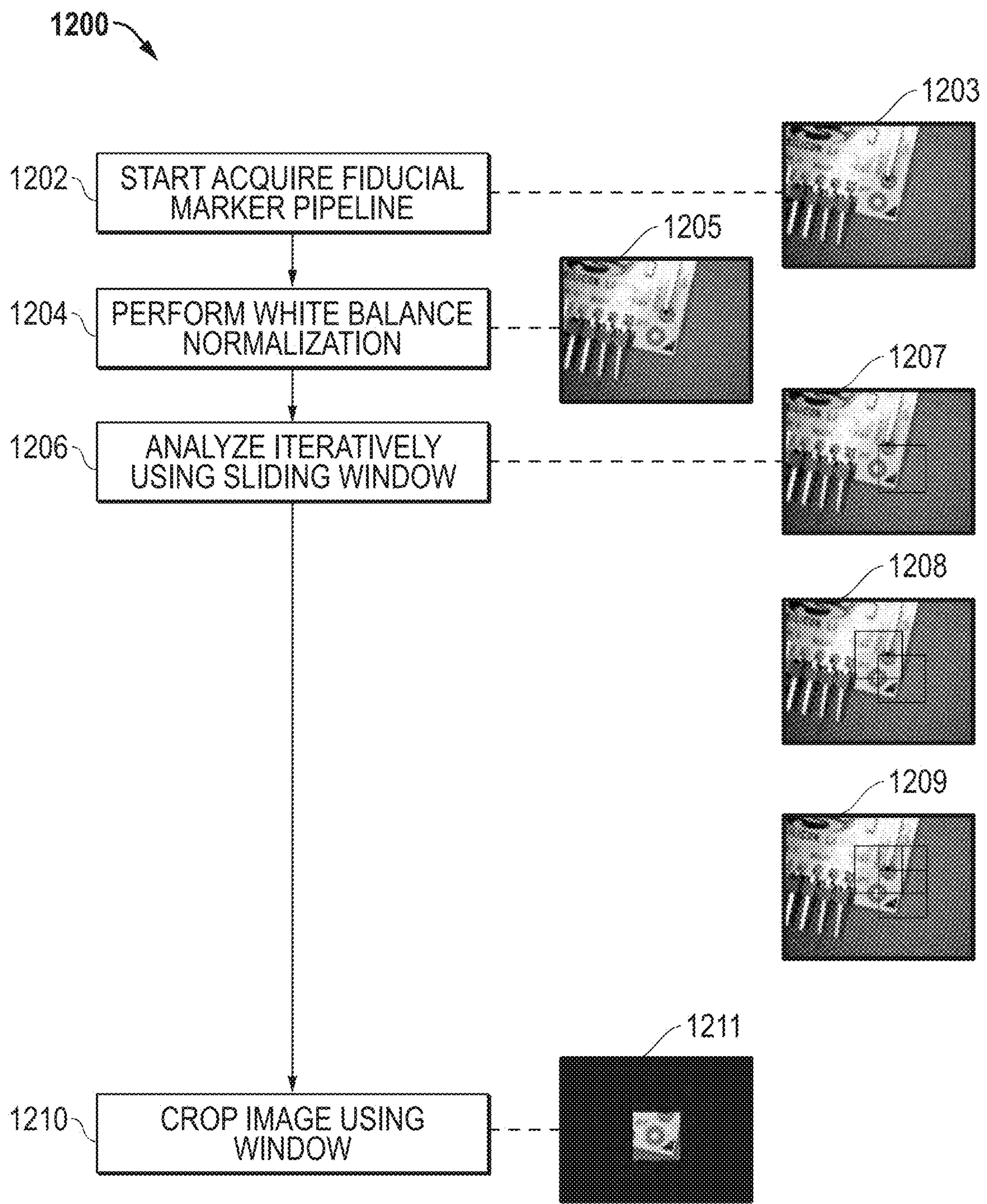
FIGS. 12 and 13 show a flow diagram of an exemplary acquire fiducial marker profile pipeline with corresponding images.
Figure 13:
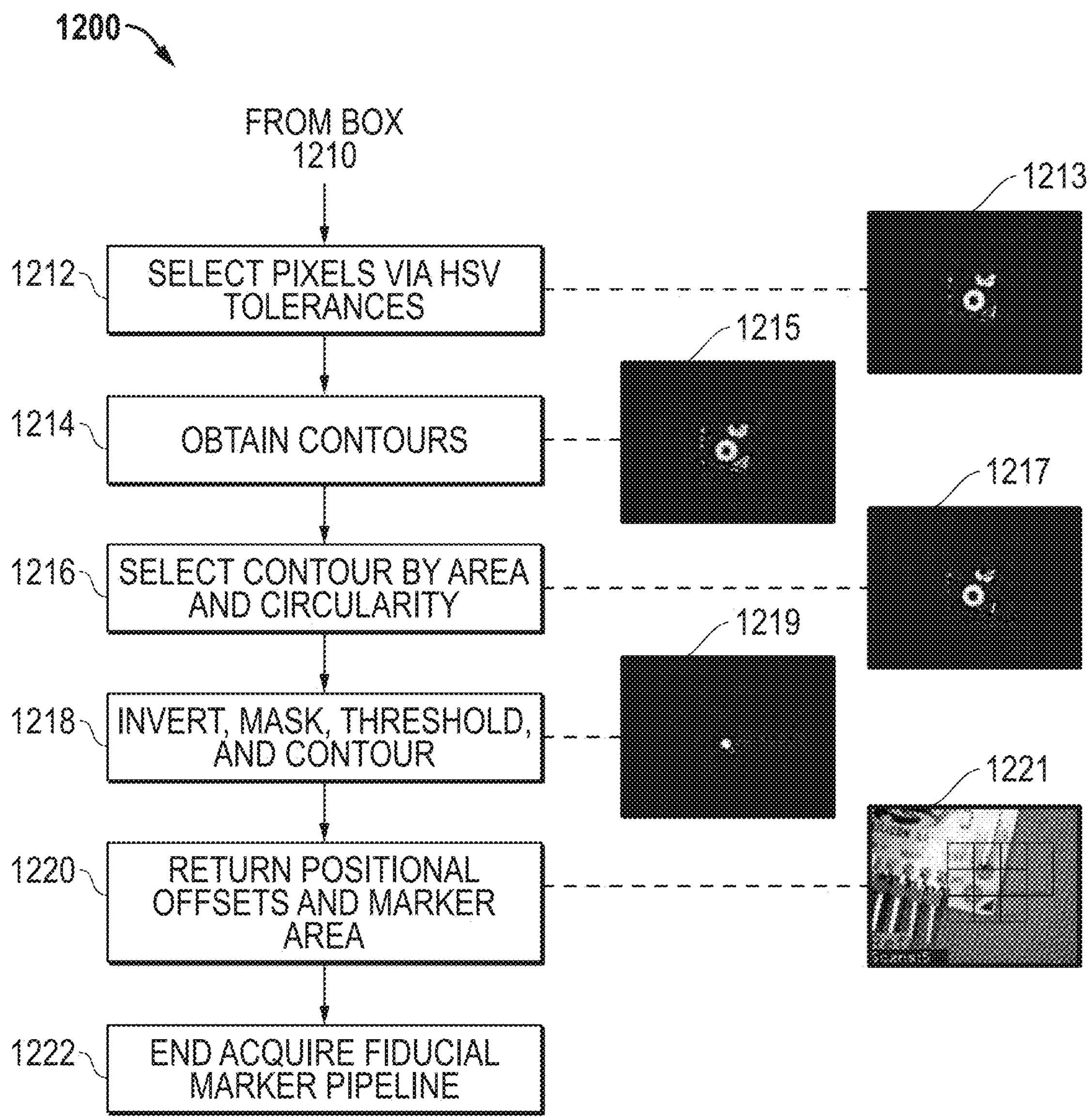

FIGS. 12 and 13 show a flow diagram of an exemplary acquire fiducial marker pipeline 1200 with corresponding images. Acquire fiducial marker pipeline 1200 performs image processing on an image taken by top camera 430 to determine a relative position between robotic arm 142 and socket 112 in response to locating fiducial marker 114 and to compensate for stepper motor slips. In FIG. 12 at box 1202, image processor 146 starts the acquire fiducial marker profile, in which image 1203 shows a captured image of the corner of test board 110 against a certain background during an actual operation.

At box 1204, image processor 146 performs white balance normalization. The aim of white balance normalization is to ensure image consistency by correcting the image's white balance against a reference image, because the acquired image is affected by light from reflective sources, such as PCB components and the highly reflective polymeric top coating. Image processor 146 uses a corner of both a reference image and image 1203, in which average color is expected to be constant. Image processor 146 first transforms both the original image and the acquired image to the LAB color space. The LAB color space expresses color as three values: L for lightness from black (0) to white (100), A from green (−) to red (+), and B from blue (−) to yellow (+). The LAB color space was chosen because the white balance of images is known to be affected by natural and artificial light, which impacts the image's color temperature and tint respectively, that corresponds to "A" and "B" axes, respectively, in the LAB color space. The LAB color space was designed so that the same amount of numerical change in these values corresponds to roughly the same amount of visually perceived change. Box 1204 corrects the A and B values in the original image until the average of the A and B values in the image corner of the captured image is about the same as in the reference image. Image 1205 shows the corrected (i.e. normalized) image.

At box 1206, image processor 146 iteratively uses a sliding window to obtain fiducial marker 114 by using square windows that isolate noise from similarly-colored components. As shown in images 1207, 1208, and 1209, successive square sliding windows are defined, in which the length of the window is twice the size of the expected marker radius plus a small tolerance, and the sliding distance is the length divided by two. The window slides until it exceeds the image boundary. In the example shown in FIG. 12, box 1206 produces three windows.

At box 1210, the image is cropped to limit the further image processing operation to the cropped window. Pixels outside the cropped area are colored black, as shown in image 1211.

In FIG. 13, box 1212 selects pixels via HSV tolerances to identify fiducial marker 114 by its hue color. First, image processor 146 performs color space transformation to change the image from the RGB color space to the HSV color space. Then the image is converted into a binary image, in which pixels having H, S, and V values within tolerances of the expected color of fiducial marker 114 are set to a value of "1", and having one or more H, S, or V value outside tolerances of the expected color of fiducial marker 114 are set to a value of "0". The resulting image is shown in image 1213. Note that in other embodiments, the color-based selection described in FIG. 12 can be replaced with a contrast-based selection. Contrast-based selection is useful in systems with strong lighting, but color-based selection was preferred for use with robot arm 142 because of the uneven lighting provided by LED fixture 440.

At box 1214, the contours of the binary image are obtained by grouping pixels together to draw their perimeters. Image processor 146 obtains the contours for groups of pixels whose neighboring pixels share the same value, for both bright and dark pixels. The result is shown in image 1215.

At box 1216, contours are selected by their area and circularity. The purpose of box 1216 is to filter out noise blobs as possible contours representing the chip slot in which an area checking operation filters excessively small pixel groups, and a circularity operation filters excessively asymmetrical pixel groups that are unlikely to correspond to fiducial marker 114. The area of each enclosed contour is the number of pixels contained within it. Blobs are first selected if their area is above a minimum amount, with unselected blobs likely representing noise blobs. Then the blobs are then checked for their circularity. The circularity check proceeds as follows. First, image processor 146 determines their centers using the OpenCV moments function. Circularity is defined as the ratio of the minimum distance from the center, divided by the maximum distance from the center. If this ratio is greater than 0.5, then the blob is judged to be a fiducial marker and not a noise blob. For example, the circular pattern in the middle of image 1217 has a circularity of 0.86, indicating that it is likely fiducial marker 114.

At box 1218, image processor 146 performs an invert, mask, contour, and threshold operation to acquire the center of fiducial marker 114. First, image processor 146 inverts the binary image. Then image processor 146 masks all pixels outside the chosen contour by changing their color to black. Image processor 146 next performs thresholding to decide which pixels to detect as the reflective center. Thresholding is performed by converting the remaining image to binary in which if its value is greater than a threshold, it is converted into a "1", and is if it less than a threshold it is converted into a "0". The contours are again obtained as described in boxes 1212 and 1214. The resulting image is shown in image 1219

At box 1220, acquire fiducial marker pipeline 1200 returns positional offsets and marker area. The X- and Y-positions indicate the offset from the top camera center, and the area represents the Z-distance. Image 1221 shows the centroid of the fiducial marker.

At box 1222, acquire fiducial marker pipeline 1200 is complete.

Thus to perform acquire fiducial marker pipeline 1200, image processor 146 performs the following image processing functions: color space transformation from the RGB color space to the LAB color space, optical windowing, image cropping, color space transformation from the RGB color space to the HSV color space, performing binary conversion, contouring, calculating area and circularity on geometric shapes, image inversion, image masking, thresholding, and centroid calculation. It detects fiducial maker 114 as a landmark by performing reflection compensation and color detection of the reflection compensated (i.e. white balanced) image.

Classify Status of Chip at Socket

The final exemplary pipeline is a classify status of chip at socket pipeline that is used to check whether the chip has been properly placed in the socket, is misaligned in the socket, or if the socket lid is closed. The classify status of chip at socket pipeline uses top camera 430, and returns an image classification result and a confidence index. The classify status of chip at socket pipeline can be implemented using any kind of image categorization tool, such as neural network, color labelling, etc.

To perform the exemplary classify status of chip at socket pipeline, image processor 146 performs the following image processing functions: performing grayscale transformation using OpenCV's cvtColor function, performing gaussian blurring by applying an OpenCV gaussian blur, pixel masking using primary and secondary masks, image cropping, performing histogram equalization via the OpenCV built-in function equalizeHist() performing image decomposition, and performing nearest-neighbor classification.

Robotic Arm Control and Placement

Robotic arm system 140 assumes that controller 144 can initially position robotic arm 142 reasonably close to the target locations to allow the image processing pipelines described above to determine any remaining offsets caused by stepper motor slippage and move robotic arm 142 to highly accurate positions relative to the target locations according to the remaining offsets. The initial placement procedure that is done during the setup stage will now be described.

Robotic arm system 140 moves robotic arm 142 to a reference point at relatively slow speeds and top camera 430 images the reference point. This image, which may be referred to as "IMAGE 1", serves as a reference image for later use during normal operation to determine whether robotic arm 142 has returned to the same reference point when it is moving at relatively fast speeds. After recording the positional coordinates of the reference point from the origin, i.e. the main axis of robotic arm 142, controller 144 moves robotic arm 142 to each precision target location, e.g., socket 112, and determines the positional offsets from the reference point to the target location. Moving robotic arm 142 at slow speeds during initial placement reduces the chance for motor slippages, especially when the motors have been calibrated using accelerometers and switches. Moreover, the slow speed is acceptable since this procedure is only performed during setup. Controller 144 performs a series of mathematical calculations at each target location to determine the offsets that are needed for each motor of robotic arm 142 using a procedure that will now be described. This procedure is notably different from known calibration techniques that use physical sensors such as limit switches, and accelerometers to obtain joint angles. Once controller 144 has determined these positional offsets for each target location under conditions that are expected to produce little or no slippage, then robotic arm system 140 is ready to being operation at relatively fast speeds at which the stepper motors may slip, while compensating for these slippages using the image processing pipelines described above.

The compensation technique uses a polar coordinate system to take advantage of the fact that stepper motor slips are angular. For example, when motor 322 slips, the polar angle θ in the X-Y transformed polar plane and the R-component in the cartesian space are affected directly.

The compensation procedure, known as step 0, is done only once at the setup phase and proceeds as follows. Before operation, controller 144 calculates and records the polar coordinate relationship between image-acquirable reference point and the target location. Controller 144 does a generic calibration from a reference position. Using the exemplary Dobot Magician robotic arm, for example, this step can be performed using an available application programming interface (API). Controller 144 moves robotic arm 142 very slowly to minimize motor slips, until top camera 430 is exactly at the reference point. Next, controller 144 records the X and Y cartesian coordinates of this position from the origin, which for some robotic arms can be performed using an available API. This is position "$A_{xy}$" that represents the coordinate set ($A_x$, $A_y$). Then, controller 144 moves robot arm 142 very slowly to a target location (e.g. socket 112). Controller 144 records the X and Y cartesian coordinates of this position, known as "$B_{xy}$" that represents coordinate set ($B_x$, $B_y$). Controller 144 derives the polar distance "$\overline{D}$" between positions A and B, and the polar angle θ formed between the origin-A and origin-B line segments. Controller 144 also records the Z- and R-coordinates of the target location, designated $B_z$ and $B_r$, respectively.

During operation, controller 144 determines the actual amount of slippage after moving robotic arm 142 to the reference point at a relatively fast speed. Controller 144 determines the amount of compensation needed after an actual movement at fast speeds to obtain the precise X-, Y-, Z-, and R-coordinates of the target location.

First, controller 144 moves robotic arm 142 to position A. Controller 144 assumes that the reference point can be seen by top camera 430. Then, controller 144 walks robotic arm 142 until top camera 430 is precisely at the reference point. This position is designated "$A'_{xy}$"=($A'_x$, $A'_y$). The third step combines the parameters from the first and second steps to determine the positional compensations needed on-the-fly. First, a parameter designated "$B'_{xy}$" is calculated. B' is formed by applying polar distance $\overline{D}$ and polar angle θ to position $A'_{xy}$ to calculate the compensated position $B'_{xy}$ to compensate for the X- and Y-coordinates. The magnitude and angle of the difference between $A'_{xy}$ and $A_{xy}$ is determined by multiplying a fixed constant k by mag($A'_{xy}$−$A_{xy}$) and adding this product to $B_z$ to obtain $B'_z$, which compensates for the Z-coordinate. Then angle($A'_{xy}$−$A_{xy}$) is subtracted from $B_r$ to obtain $B'_r$, which compensates for the R-coordinate.

After performing these steps, the arm placement compensation obtains the four coordinates of robotic arm 142 when suction nozzle is at the target location: $B'_x$, $B'_y$, $B'_z$, and $B'_r$. Controller 144 uses this value during normal operation to move robotic arm 142 to the particular target location. Given $A_{xy}$, $B_{xy}$, and $A'_{xy}$, controller 144 can solve for $B'_{xy}$. Using polar distance $\overline{D}$ and polar angle θ is one technique for doing it, but other techniques are possible.

Figure 14:
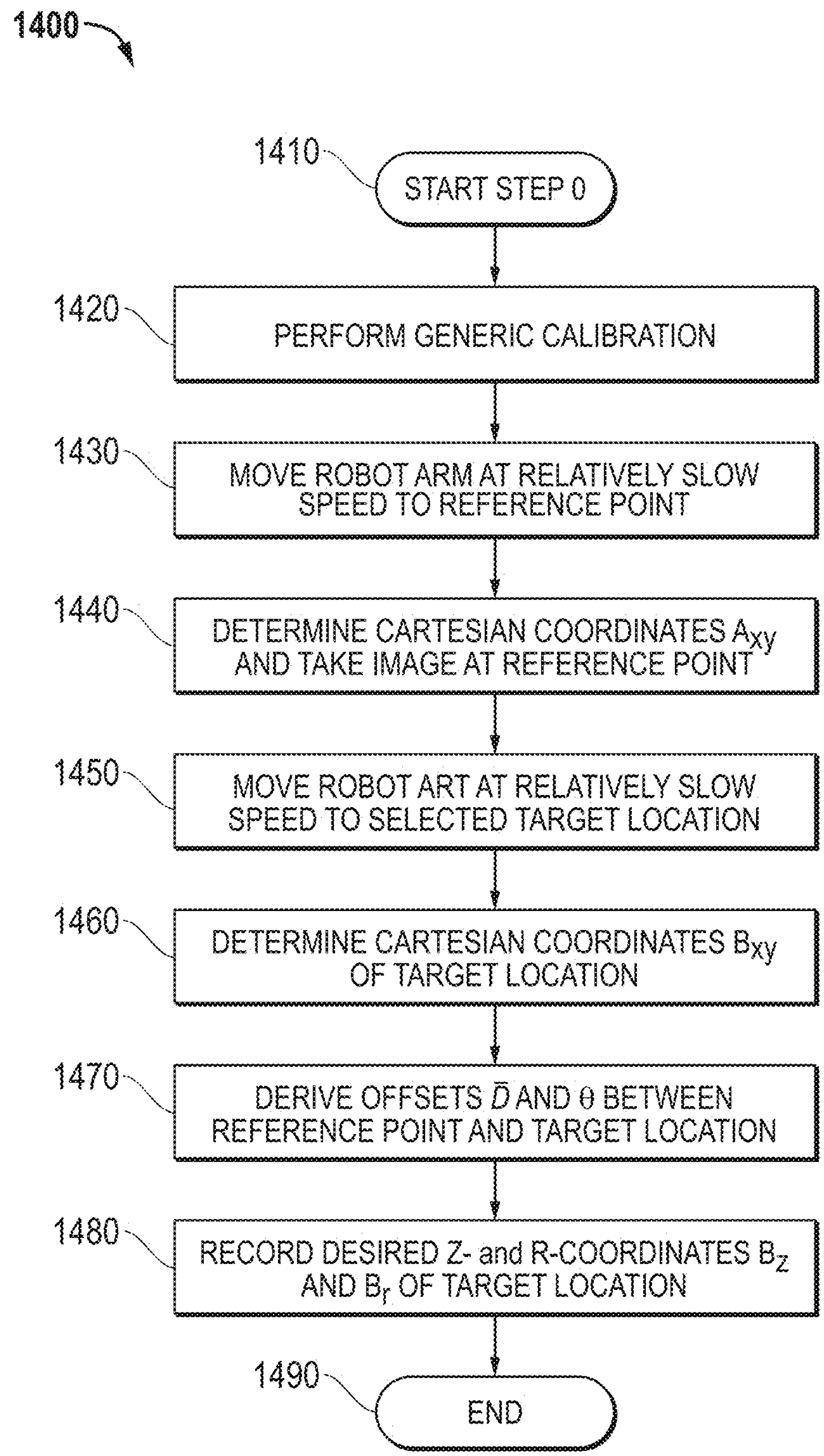
FIG. 14 illustrates a flow diagram of a procedure for determination of initial target location coordinates.

FIG. 14 illustrates a flow diagram of a procedure 1400 for determination of initial target location coordinates. Procedure 1400 implements Step 0 and begins at box 1410. At action box 1420, controller 144 performs a generic calibration of the robot arm. At action box 1430, controller 144 moves robotic arm 142 to a reference point slowly to reduce or minimize slippages. Then at action box 1440, controller 144 determines the cartesian coordinates $A_{xy}$ of the robot arm at the reference point, and takes an image for later use. Next at action box 1450, controller 144 again moves robotic arm slowly to a selected target location. For example, the target location may place the suction tip over socket 112. At this point, top camera 430 may not be able to see the socket because of the distance between it and suction tip 382. Then at action box 1460, controller 144 determines the cartesian coordinates $B_{xy}$ of the target location. At action box 1470, controller 144 determines the polar offsets formed by polar distance $\overline{D}$ and polar angle θ between the reference point and the target, or $A_{xy}$ and $B_{xy}$. Then at action box 1480, controller 144 determines the desired Z- and R-coordinates $B_z$ and $B_r$, respectively, at the target location. These coordinates could be, for example, the distance along the z-axis for the end of the suction tip to contact a chip in the socket and the rotational amount along the r-axis of the rotation needed to place the chip in the socket. At action box 1490, procedure 1400 ends.

Figure 15:
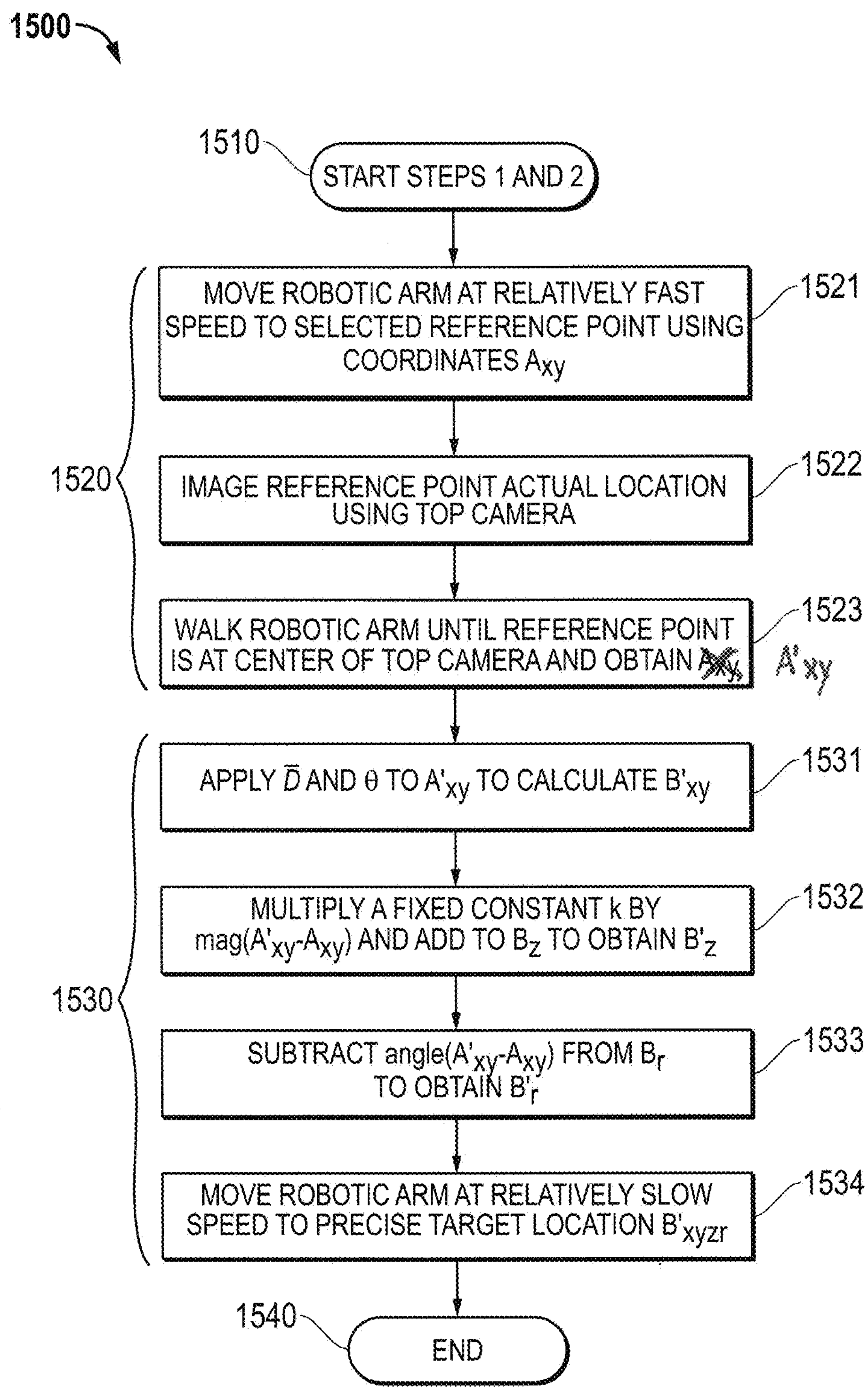
FIG. 15 illustrates a flow diagram of a procedure for moving a chip to or from a target location at fast speeds during operation.

FIG. 15 illustrates a flow diagram of a procedure 1500 for moving a chip to or from a target location at fast speeds during operation. Procedure 1500 implements Step 1 and Step 2 and starts at box 1510. Step 1 includes a set of action boxes 1520 and includes action boxes 1521, 1522, and 1523. At action box 1521, controller 144 moves robotic arm 142 automatically at a fast speed to a selected reference point using cartesian coordinates $Ax_y$. Because of the fast speed some slippage can be expected, although procedure 1500 assumes that top camera 430 will be close enough to the reference point (e.g., a reference marker) that the image will be in view. At action box 1522, controller 144 images the reference marker using top camera 430. Then at action box 1523, controller 144 walks robotic arm 142 until the reference marker is at the center of top camera 430 based on the difference between the reference image and the actual image, and obtains $A'_{xy}$ from the coordinates at the precise target location.

Step 2 includes a set of action boxes 1530 and includes action boxes 1531, 1532, and 1533. At action box 1531, controller 144 applies polar distance $\overline{D}$ and polar angle θ to $A'_{xy}$ to calculate the cartesian coordinate to the target $B'_{xy}$. At action box 1532, controller 144 multiplies a fixed constant k by $mag(A'_{xy}-A_{xy})$ and adds it to $B_z$ to obtain $B'_z$. At action box 1533, controller 144 subtracts $angle(A'_{xy}-A_{xy})$ and adds it to $B_r$ to obtain $B'_r$. Having obtained the complete set of coordinates for the target location, which top camera 430 cannot accurately image and locate, controller 144 at step 1534 moves robotic arm 142 slowly to the precise target location $B'_{xyzr}$. The slow movement will not significantly affect the operation of robotic arm 142 because the distance between the reference point and the target location will be small. At box 1540, procedure 1500 ends.

Once robotic arm 142 is at precise target location $B'_{xyzr}$, controller 144 can proceed to perform an appropriate further action. For example, if the target location is socket 112, controller 144 can place a chip in the socket, extract a chip from the socket, open or close the socket, etc.

Conclusion

By using only two cameras and a four degree-of-freedom robotic arm using stepper motors (e.g., the Dobot Magician) with image processing, robotic integrated circuit placement system 100 compensates for stepper motor slippage, compensates for reflection when locating a landmark, and allows success to be verified at each stage. Thus, robotic integrated circuit placement system 100 provides an affordable yet accurate chip placement system to automate the pick-and-place function of the integrated circuit characterization process. It combines an inexpensive robotic arm using only stepper motors with inexpensive RGB cameras to keep the system affordable. Since the robotic arm movements are made by stepper motors that allow slippage, the robotic arm is safe and cannot harm personnel or equipment. The system also has a small footprint, and in the example of the Dobot Magician, the system requires only approximately 60 centimeters (cm) by 60 cm for the staging area, which is suitable for mounting on typical laboratory benches using conventional equipment. Moreover, it provides robust pick-and-place operation by compensating for human error (e.g., the device under test's starting position) and random error (e.g., it allows for the pick-and-place sequence to be redone if it is unsuccessful).

By adding two cameras and performing image processing, robotic integrated circuit placement system 100 overcomes the limitations of low-cost novelty robotic arms that use stepper motors prone to slippage. Robotic integrated circuit placement system 100 allows the migration of robotics to many other environments that would normally not justify the cost and safety concerns of a high-end robotics system.

Thus, a robotic arm system suitable for such tasks as moving an integrated circuit chip between a chip slot and a socket on a test board has been disclosed. In one form, the robotic arm system includes a robotic arm having at least one stepper motor and operable to move an end of the robotic arm in X-, Y-, and Z-dimensions, a camera attached to the robotic arm, and a controller coupled to the robotic arm and to the camera. During configuration, the controller moves the end of the robotic arm to a reference point to obtain initial reference coordinates and a reference image, and to a target location to obtain initial target coordinates. During operation, the controller moves the robotic arm according to the initial reference coordinates, adjusts a position of the robotic arm to an actual reference location using the camera to determine actual reference coordinates, and moves the robotic arm to an actual target location using the initial target coordinates and a difference between the initial reference coordinates and the actual reference coordinates.

The above-disclosed subject matter is to be considered illustrative, and not restrictive, and the appended claims are intended to cover all such modifications, enhancements, and other embodiments that fall within the true scope of the claims. For example, certain image processing pipelines using certain image processing functions were described. However, in other embodiments, the image processing pipelines can perform other image processing functions or combinations of image processing functions than the ones described here. Moreover, the robotic arm system can be used for other tasks besides integrated circuit movement that would benefit from the use of a low-cost robotic arm based on stepper motors. The distinctive green color that chip tray 130 uses to contrast with the chip slots can be replaced with another suitable color. The controller can perform image processing using a variety of devices, such a data processor specially adapted to perform image processing, a graphics processor, a general-purpose data processor specially programmed to perform image processing, a personal computer with special image processing software, and the like.

Note that only certain locations may be precision sensitive, such as socket 112, while other locations, such as bottom camera 134 or possibly chip tray 130, are not. The robotic arm control and placement technique described above may only be performed for the positionally sensitive locations, whereas other locations can use approximate robotic arm placement and would not be sensitive to some slippage. Moreover, other types of imprecision, such as compensation for chip position within the tray slot, would need other techniques besides those described above. The robotic arm placement technique assumes that either there is a convenient reference point coincidentally available, such as fiducial marker 116, or that a marker can be placed at a location close to the target that top camera 430 can see.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A robotic arm system, comprising:

a robotic arm having at least one stepper motor and operable to move an end of said robotic arm in X-, Y-, and Z-dimensions, wherein said at least one stepper motor allows slippage at a load which cannot harm a human operator;

a camera attached to said robotic arm; and a controller coupled to said robotic arm and to said camera, wherein during configuration said controller moves said end of said robotic arm to a reference point to obtain initial reference coordinates and a reference image, and to a target location to obtain initial target coordinates, and during operation moves said robotic arm according to said initial reference coordinates, adjusts a position of said robotic arm to an actual reference location using said camera to determine actual reference coordinates, and moves said robotic arm to an actual target location using said initial target coordinates and a difference between said initial reference coordinates and said actual reference coordinates.

2. The robotic arm system of claim 1, wherein said controller moves said robotic arm at a first speed during a configuration period, and moves said robotic arm according to said initial reference coordinates at a second speed during operation, said second speed being faster than said first speed.

3. The robotic arm system of claim 2, wherein said controller moves said robotic arm between said reference point and said actual target location at a third speed, said third speed being slower than said second speed.

4. The robotic arm system of claim 1, wherein said controller adjusts said position of said end of said robotic arm by determining said difference between said initial reference coordinates and said actual reference coordinates using a polar coordinate system.

5. The robotic arm system of claim 1, wherein said at least one stepper motor comprises:

first, second, and third stepper motors that together determine an X-coordinate, a Y-coordinate, and a Z-coordinate of said end of said robotic arm.

6. The robotic arm system of claim 5, further comprising:

a fourth motor for selectively rotating a tool attached to said end of said robotic arm along a rotational (R) axis.

7. The robotic arm system of claim 6, further comprising:

a servo control system coupled to said fourth motor for selectively rotating said end of said robotic arm.

8. A robotic arm system, comprising:

a robotic arm having at least one stepper motor for controlling a position of an end of said robotic arm and having a camera attached thereto, wherein said at least one stepper motor allows slippage at a load which cannot harm a human operator; and a controller coupled to said robotic arm and to said camera, said controller determining initial reference coordinates of a reference point and initial target coordinates of a target location by moving said robotic arm at a relatively slow speed, moving said robotic arm to said target location during operation at a relatively fast speed, determining actual reference coordinates using said camera, and moving said robotic arm to said target location at said relatively slow speed using said initial target coordinates and a difference between said actual reference coordinates and said initial reference coordinates.

9. The robotic arm system of claim 8, wherein said controller moves said robotic arm at a first speed during a configuration period, and moves said robotic arm according to said initial reference coordinates at a second speed during operation, said second speed being faster than said first speed.

10. The robotic arm system of claim 9, wherein said controller moves said robotic arm between said reference point and said target location at a third speed, said third speed being slower than said second speed.

11. The robotic arm system of claim 8, wherein said controller adjusts said position of said end of said robotic arm by determining said difference between said initial reference coordinates and said actual reference coordinates using a polar coordinate system.

12. The robotic arm system of claim 8, wherein said at least one stepper motor comprises:

first, second, and third motors that together determine an X-coordinate, a Y-coordinate, and a Z-coordinate of said end of said robotic arm.

13. The robotic arm system of claim 12, further comprising:

a fourth motor for selectively rotating said end of said robotic arm.

14. The robotic arm system of claim 13, further comprising:

a servo control system coupled to said fourth motor for selectively rotating said end of said robotic arm.

15. A method of operating a robotic arm having at least one stepper motor operable to move an end of the robotic arm in X-, Y-, and Z-dimensions and a camera attached thereto, wherein the at least one stepper motor allows slippage at a load which cannot harm a human operator, comprising:

configuring the robotic arm having the at least one stepper motor, said configuring comprising:

determining initial reference coordinates of the end of the robotic arm at a reference point;

determining initial target coordinates of the end of the robotic arm at a target location; and deriving offsets between said initial reference coordinates and said initial target coordinates using the camera, and operating said robotic arm to move the end of the robotic arm to said target location using said initial reference coordinates, said initial target coordinates, and said offsets.

16. The method of claim 15, wherein:

said configuring further comprises moving said robotic arm to said reference point at a relatively slow speed before determining said initial reference coordinate, and moving said robotic arm to said target location at said relatively slow speed before determining said initial target coordinate; and said operating said robotic arm comprises moving said robotic arm to said reference point using said initial reference coordinates at a relatively fast speed.

17. The method of claim 15, wherein said operating further comprises:

adjusting said robotic arm to an actual reference point using the camera.

18. The method of claim 17, wherein:

said configuring further comprises taking a reference image at said reference point using said camera; and said adjusting comprises adjusting said robotic arm to said actual reference point by comparing an actual image to a reference image.

19. The method of claim 15, wherein:

said deriving comprises deriving said offsets between said initial reference coordinates and said initial target coordinates comprises deriving said offsets in a polar coordinate system.

20. The method of claim 15, wherein said operating said robotic arm further comprises: moving said robotic arm to said reference point during operation at a relatively fast speed.

* * * * *